United States Patent
Song (10) Patent No.: US 12,218,727 B2
(45) Date of Patent: Feb. 4, 2025

(54) CSI FEEDBACK WITH LOW OVERHEAD

(71) Applicant: NOKIA TECHNOLOGIES OY, Espoo (FI)

(72) Inventor: Nuan Song, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 182 days.

(21) Appl. No.: 17/919,428

(22) PCT Filed: Apr. 21, 2020

(86) PCT No.: PCT/CN2020/085940
§ 371 (c)(1),
(2) Date: Oct. 17, 2022

(87) PCT Pub. No.: WO2021/212327
PCT Pub. Date: Oct. 28, 2021

(65) Prior Publication Data
US 2023/0163824 A1 May 25, 2023

(51) Int. Cl.
*H04B 7/06* (2006.01)
*H04L 5/00* (2006.01)

(52) U.S. Cl.
CPC ......... *H04B 7/0626* (2013.01); *H04L 5/0048* (2013.01)

(58) Field of Classification Search
CPC .......................... H04B 7/0626; H04L 5/0048
(Continued)

(56) References Cited

U.S. PATENT DOCUMENTS 10,396,867 B2  8/2019 Kundargi et al.
2010/0272074 A1 10/2010 Cheng et al.
(Continued)

FOREIGN PATENT DOCUMENTS

CN    102077503 A    5/2011
EP      2271000 A1    1/2011
(Continued)

OTHER PUBLICATIONS

The Extended European Search Report dated Dec. 13, 2023, corresponding to European Patent Application No. 20932015.9.
(Continued)

*Primary Examiner* — Leila Malek
(74) *Attorney, Agent, or Firm* — SQUIRE PATTON BOGGS (US) LLP (57) ABSTRACT

Example embodiments of the present disclosure relate to devices, methods, apparatuses and computer readable storage media of a Channel State Information (CSI) feedback with low overhead. The method comprises in response to receiving, from a second device, a reference signal on a channel between the first device and the second device, obtaining a first component and a second component from the reference signal, the first component and the second component being orthogonal to each other; determining a first transformed component and a second transformed component for characterizing the channel by performing a transformation on the first component and the second component; generating a set of parameters associated with characteristics of the channel by quantizing the first transformed component and the second transformed component; and transmitting the set of parameters to the second device. The proposed CSI feedback can even be flexibly combined (Continued)

with existing overhead reduction schemes such as the beamformed CSI-RS and CSI compression, which further reduces the CSI overhead. Furthermore, the proposed scheme ensures very fast processing at UE and reduces the latency.

22 Claims, 8 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2015/0023440 A1* | 1/2015 | Suh | ....................... H04L 1/0073 375/267 |
| 2018/0367192 A1 | 12/2018 | O'Shea et al. | |

FOREIGN PATENT DOCUMENTS

| | | | |
|---|---|---|---|
| JP | 2003-338802 A | 11/2003 | |
| JP | 2012023703 A | 2/2012 | |
| JP | 2012-525053 A | 10/2012 | |
| JP | 2014-195144 A | 10/2014 | |
| JP | 2017038333 | * | 2/2017 |
| WO | 9641457 A1 | 12/1996 | |
| WO | WO-0141482 A1 * | 6/2001 | ............ H04W 36/18 |
| WO | 2012157393 A1 | 11/2012 | |
| WO | 2014/111750 A1 | 7/2014 | |
| WO | 2014111750 A2 | 7/2014 | |
| WO | 2018/012850 A1 | 1/2018 | |
| WO | 2019/143226 A1 | 7/2019 | |

OTHER PUBLICATIONS

Myers Nitin Jonathan et al: "Low-Rank MMwave MIMO Channel Estimation in One-Bit Receivers", ICASSP 2020—2020 IEEE International Conference on Acoustics, Speech and Signal Processing (ICASSP), IEEE, (Apr. 9, 2020).

Jang Jeonghyeon et al: "Deep Learning-Based Limited Feedback Designs for MIMO Systems", IEEE Wireless Communications Letters, IEEE, Piscataway, NJ, USA, vol. 9, No. 4, Dec. 24, 2019 (Dec. 24, 2019), pp. 558-561.

Office Action dated Jan. 17, 2023, corresponding to Indian Patent Application No. 202247065580.

International Search Report and Written Opinion dated Jan. 27, 2021 corresponding to International Patent Application No. PCT/CN2020/085940.

Notice of Reasons for Refusal dated Oct. 30, 2023, corresponding to Japanese Patent Application No. 2022-564279.

Notification of Reasons for Refusal dated Jul. 29, 2024 corresponding to Japanese Patent Application No. 2022-564279, with English translation thereof.

* cited by examiner

CSI FEEDBACK WITH LOW OVERHEAD

FIELD

Embodiments of the present disclosure generally relate to the field of telecommunication and in particular, to a device, method, apparatus and computer readable medium of Channel State Information (CSI) feedback with low overhead.

BACKGROUND

Recently, the Machine Learning (ML) based Multiple Input Multiple Output (MIMO) attracts significant attentions and shows its advantages especially in the physical layer solutions such as beamforming and CSI acquisition. The ML based massive MIMO schemes can provide a performance enhancement and reduce the computational complexity, overhead, as well as latency.

For the study of the 6G wireless technology, one of the key topics in future MIMO technology is the Artificial Intelligence (AI)/ML enabled MIMO. The ML for massive MIMO is considered as "drive" and "lead" in the future standard strategy. One of the open issues includes CSI overhead reduction.

SUMMARY

In general, example embodiments of the present disclosure provide a solution of CSI feedback with low overhead.

In a first aspect, there is provided a first device. The first device comprises at least one processor; and at least one memory including computer program codes; the at least one memory and the computer program codes are configured to, with the at least one processor, cause the first device at least to in response to receiving, from a second device, a reference signal on a channel between the first device and the second device, obtain a first component and a second component from the reference signal, the first component and the second component being orthogonal to each other; determine a first transformed component and a second transformed component for characterizing the channel by performing a transformation on the first component and the second component; generate a set of parameters associated with characteristics of the channel by quantizing the first transformed component and the second transformed component; and transmit the set of parameters to the second device.

In a second aspect, there is provided a second device. The second device comprises at least one processor; and at least one memory including computer program codes; the at least one memory and the computer program codes are configured to, with the at least one processor, cause the second device at least to transmit a reference signal to a first device on a channel between the first device and the second device; receive, from a first device, a set of parameters associated with characteristics of the channel, the set of parameters being generated by transforming and quantizing a first component and a second component obtained from the reference signal at the first device, the first component and the second component being orthogonal to each other; and determine channel state information of the channel based on the set of parameters.

In a third aspect, there is provided a method. The method comprises in response to receiving, from a second device, a reference signal on a channel between the first device and the second device, obtaining a first component and a second component from the reference signal, the first component and the second component being orthogonal to each other; determining a first transformed component and a second transformed component for characterizing the channel by performing a transformation on the first component and the second component; generating a set of parameters associated with characteristics of the channel by quantizing the first transformed component and the second transformed component; and transmitting the set of parameters to the second device.

In a fourth aspect, there is provided a method. The method comprises transmitting a reference signal to a first device on a channel between the first device and the second device; receiving, from a first device, a set of parameters associated with characteristics of the channel, the set of parameters being generated by transforming and quantizing a first component and a second component obtained from the reference signal at the first device, the first component and the second component being orthogonal to each other; and determining channel state information of the channel based on the set of parameters.

In a fifth aspect, there is provided an apparatus comprising means for in response to receiving, from a second device, a reference signal on a channel between the first device and the second device, means for obtaining a first component and a second component from the reference signal, the first component and the second component being orthogonal to each other; determining a first transformed component and a second transformed component for characterizing the channel by performing a transformation on the first component and the second component; means for generating a set of parameters associated with characteristics of the channel by quantizing the first transformed component and the second transformed component; and means for transmitting the set of parameters to the second device.

In an sixth aspect, there is provided an apparatus comprising means for transmitting a reference signal to a first device on a channel between the first device and the second device; means for receiving, from a first device, a set of parameters associated with characteristics of the channel, the set of parameters being generated by transforming and quantizing a first component and a second component obtained from the reference signal at the first device, the first component and the second component being orthogonal to each other; and means for determining channel state information of the channel based on the set of parameters.

In a seventh aspect, there is provided a computer readable medium comprising a computer program for causing an apparatus to perform at least the method according to the third aspect.

In an eighth aspect, there is provided a computer readable medium comprising a computer program for causing an apparatus to perform at least the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
 (i) a combination of analog and/or digital hardware circuit(s) with software/firmware and
 (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

Figure 1:
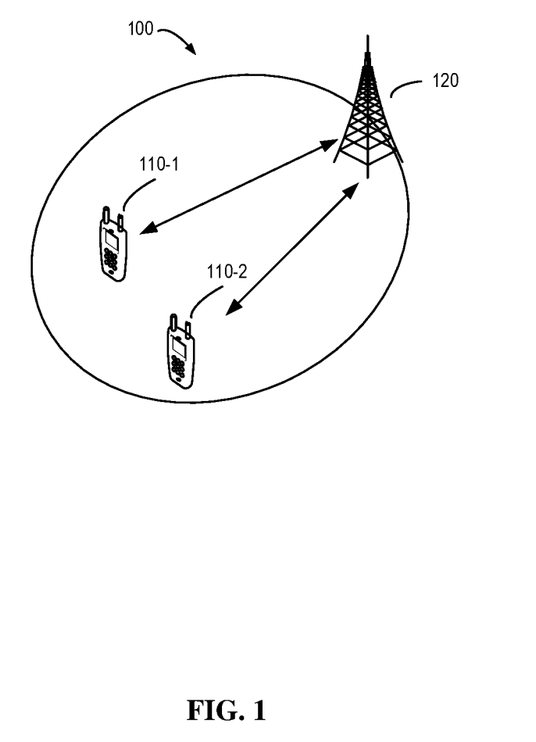
FIG. 1 shows an example communication network in which embodiments of the present disclosure may be implemented.

FIG. 1 shows an example communication network 100 in which embodiments of the present disclosure can be implemented. As shown in FIG. 1, the communication network 100 comprises terminal devices 110-1 and 110-2 (hereafter also referred to as a first device 110 or an UE 110 collectively) and a network device 120 (hereafter also referred to as a second device 120 or a gNB 120). The terminal devices 110-1 and 110-2 may communicate with the network device 120. It is to be understood that the number of network devices and terminal devices shown in FIG. 1 is given for the purpose of illustration without suggesting any limitations. The communication network 100 may include any suitable number of network devices and terminal devices.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

Massive MIMO is one of the key technologies in 5G communication systems because of its high potential of further exploring array gain, multiplexing gain, the capability of interference mitigation, etc. The essential factor involved with achieving these advantages is to design accurate CSI acquisition schemes for efficient and robust beamforming techniques. With the increased number of antenna ports, the CSI to be estimated at the UE has a large dimension. Once the UE obtains the downlink CSI, to feedback the whole explicit CSI will improve the MIMO transmission performance but also lead to a significantly large overhead.

The number of quantization bits for the CSI feedback in the current system is, e.g., 8 bits. This is still one significant factor that limits the CSI feedback overhead. A smaller quantization level would lead to an inaccurate CSI acquisition and accordingly a worse system performance. Therefore, the existing massive MIMO systems need advanced CSI feedback mechanism to enhance the performance but meanwhile demand a much reduced overhead.

A scheme of "Analog CSI feedback" is considered as a promising alternative solution for further wireless communications. It refers to the transmission of the estimated downlink channel coefficients by UE using unquantized quadrature-amplitude modulation. It is a scaled version of its common downlink training observation, e.g., from the CSI-RS. The gNB estimates the downlink channel based on the UE's forwarding of the unquantized CSI. Compared to the digital feedback, analog feedback does not have the operations of quantization or mapping to a codebook and encoding, which can alleviate UE's processing complexity. However, analog feedback has power variations and channel recovery problem. The overhead also scales with the number of antennas as well as the overhead for the downlink CSI-RS transmission. It is also difficult to implement for system with a large bandwidth. Furthermore, it requires huge standard modifications.

Therefore, the present disclosure proposes a solution to achieve a one-bit quantized CSU feedback. At the UE side, the inphase and the quadrature components can be extracted from a received reference signal. The inphase and the quadrature components can be transformed and quantized respectively to generate the one-bit quantized raw CSI feedback. At the gNB side, the one-bit quantized raw CSI feedback can be input to a ML model where CSI can be recovered from the one-bit quantized raw CSI feedback. The proposed CSI feedback can even be flexibly combined with existing overhead reduction schemes such as the beamformed CSI-RS and CSI compression, which further reduces the CSI overhead. Furthermore, the proposed scheme ensures very fast processing at UE and reduces the latency.

Figure 2:
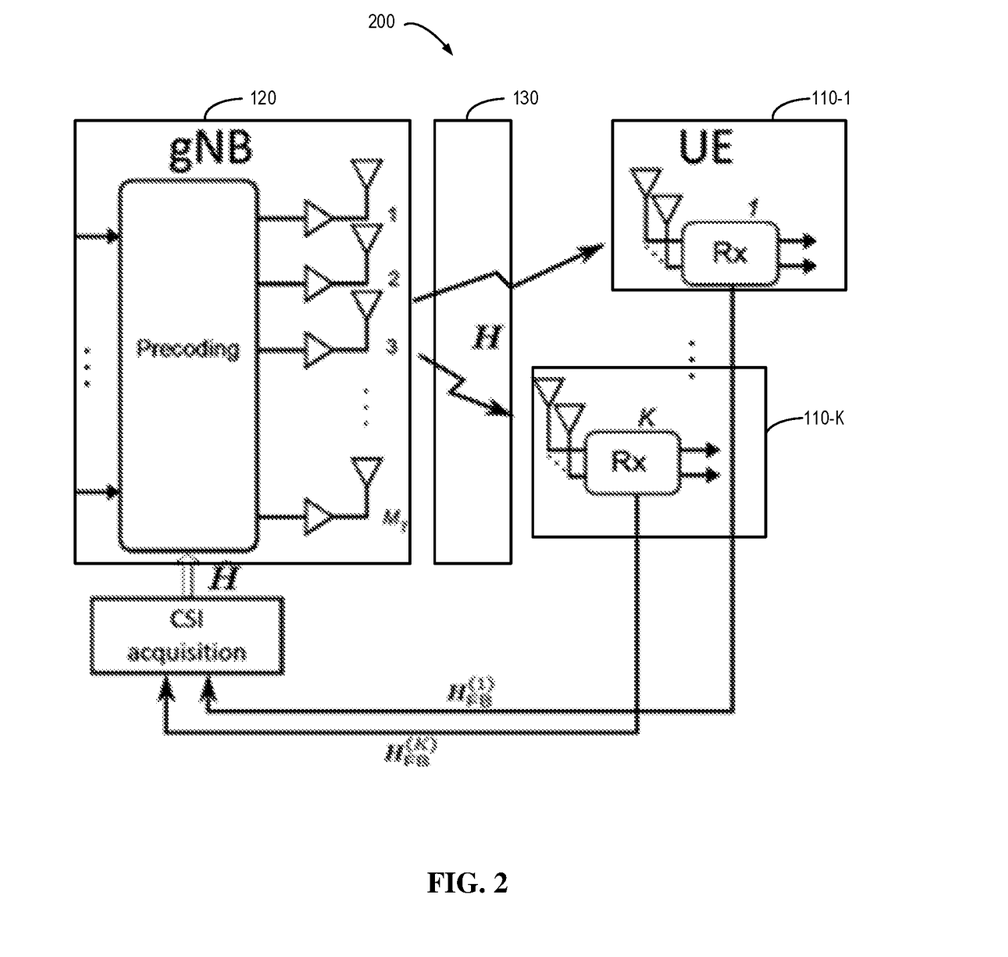
FIG. 2 shows an example structure of MU-MIMO system according to some example embodiments of the present disclosure.

Principle and implementations of the present disclosure will be described in detail below with reference to FIGS. 2 to 4. FIG. 2 shows an example structure 200 of MU-MIMO system according to some example embodiments of the present disclosure.

As shown in FIG. 2, the gNB 120 is mounted with $M_T$ transmitting antenna ports. The gNB 120 may simultaneously serve K users, namely the UEs 110-1 to 110-K, where each UE may have $M_{R_k}$ receiving antennas. The complete channel 130 in this structure may be represented by $H \in \mathbb{C}^{M_R \times M_T}$, where $M_R = \Sigma_{k=1}^K M_{R_k}$ is the total number of receive antennas from all UEs 110-1 to 110-K. The mmWave channel is represented by the widely used clustered model, represented by $H_k$ for the $k^{th}$ UE.

The gNB 120 may require the CSI H=[H$^{(1)}$, H$^{(2)}$, . . . , H$^{(K)}$] to design the transmitting processing such as precoding for K UEs. In FDD system, the downlink channel H can be obtained via the CSI feedback from UEs 110-1 to 110-K.

Assuming the CSI-RS to be sent as $X \in \mathbb{C}^{M_T \times N_{RS}}$, the received signal at the UE 110 can be written as:

$$Y=\sqrt{P}HX+N \in \mathbb{C}^{M_R \times N_{RS}} \quad (1)$$

where P is the power of the transmitted CSI-RS, $N_{RS}$ is the RS length and N is the Additive White Gaussian Noise (AWGN) and other interference with a zero mean and a power spectral density $N_0$.

Figure 3:
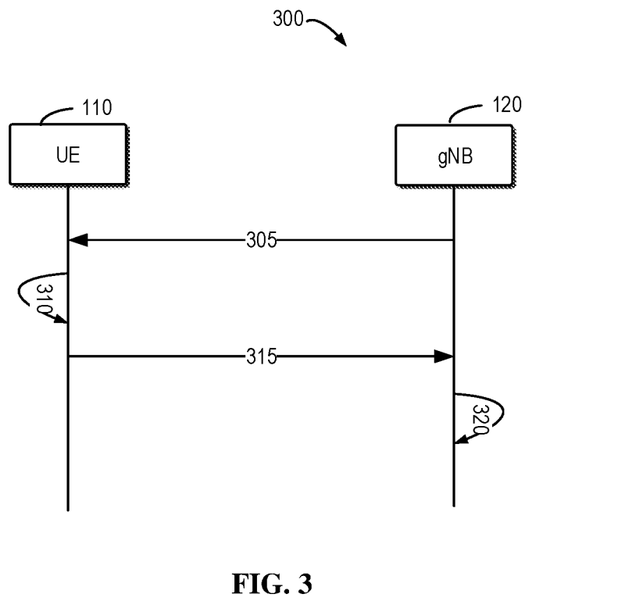
FIG. 3 shows a signaling chart illustrating a CSI feedback process according to some example embodiments of the present disclosure.

FIG. 3 shows a signaling chart illustrating an event triggered measurement for CSI-RS according to some example embodiments of the present disclosure. For the purpose of discussion, the process 300 will be described with reference to FIG. 1. The process 300 may involve the UE 110 and the gNB 120 as illustrated in FIG. 1. It would be appreciated that although the process 300 has been described in the communication network 100 of FIG. 1, this process may be likewise applied to other communication scenarios.

For obtaining the one-bit quantized CSI report, before transmitting the reference signal to the UE 110, the gNB 120 may trigger the one-bit quantized CSI and send the trigger to the dedicated UE. As shown in FIG. 3, the gNB 120 transmits 305 a trigger to the UE 110 for initiating the quantizing. The trigger may initiate the UE 110 to perform a one-bit quantizing procedure to and transmit the result of the one-bit quantizing to the gNB 120.

Figure 4:
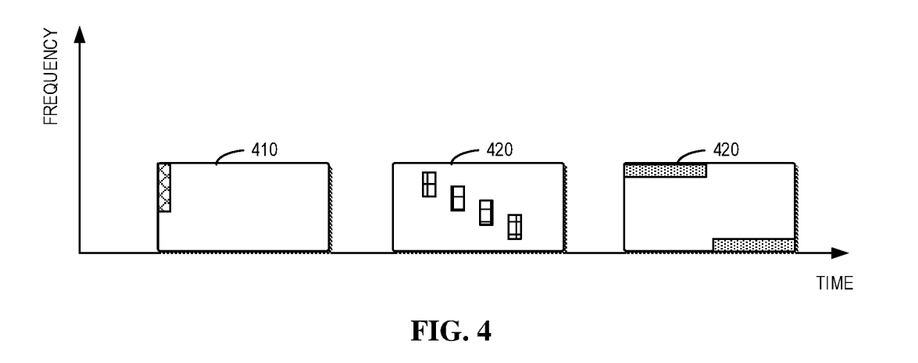
FIG. 4 shows an example of a subframe to trigger the one-bit quantized CSI reporting according to some example embodiments of the present disclosure.

FIG. 4 shows an example of a subframe to trigger the one-bit quantized CSI reporting according to some example embodiments of the present disclosure. As shown in FIG. 4, the trigger can be included in a downlink transport block 410. A further downlink transport block 420 for transmitting the reference signal (CSI-RS) can follow the transport block 410. Based on the trigger, the UE 110 may perform the one-bit quantizing for the CSI-RS and generate the one-bit CSI report. The one-bit CSI report can be included in an uplink transport block 430.

In some example embodiments, the trigger may indicate a one-bit quantizing scheme for the reference signal. For example the trigger may be transmitted to the UE 110 via Downlink Control Information (DCI) or Medium Access Control Control Elememt (MAC CE).

Referring back to the FIG. 3, when the UE 110 has already receive a trigger for reporting the one-bit quantized CSI, if the UE receives a reference signal, such as CSI-RS, the UE 110 may perform 310 the one-bit quantization.

Figure 5:
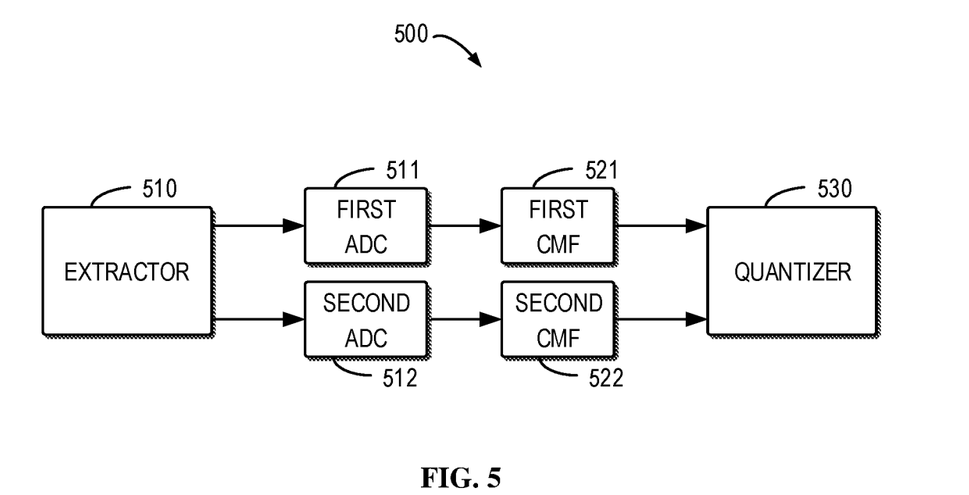
FIG. 5 shows an example structure for generating one-bit quantized CSI feedback according to some example embodiments of the present disclosure.

FIG. 5 shows an example structure for generating one-bit quantized CSI feedback according to some example embodiments of the present disclosure. As shown in FIG. 5, the receive reference signal can be processed by an extractor 510 to extract an inphase component and a quadrature component, which are orthogonal to each other. The inphase component and the quadrature component can be converted by the first Analog-Digital-Converter (ADC) 511 and a second ADC 512, respectively.

After that, the UE 110 may perform a transformation of the the inphase component and the quadrature component to determine a transformed inphase component and a transformed quadrature component for characterizing the channel.

For example, the inphase component and the quadrature component can be transformed into a code correlation domain, for example, by a first Code Matched Filter (CMF) 521 and a second CMF 522 that associated with the CSI-RS sequences, respectively. Hereinafter the term "code correlation domain" may be referred to as a code domain where the characteristics of the channel can be maximized. The resulting signal is denoted by:

$$\bar{Y}=\sqrt{P}HXX^H+NX^H \triangleq \sqrt{P}H+V \quad (2)$$

where the transmitting reference signal X is designed to satisfy $XX^H = I_{M_T}$. The transmit SNR of the CSI-RS can be given by:

$$SNR_{T_x} = 10 \cdot \log_{10}\left(\frac{P}{N_0}\right)(dB) \quad (3)$$

After transforming, the transformed inphase component and the transformed quadrature component can be quantized by a quantizer 530, for example, a one-bit quantizer 530. Then the one-bit quantized raw CSI can be obtained and given by:

$$\bar{H}_{1b} \triangleq Q_{1b}\{\sqrt{P}H+V\} \quad (4)$$

The one-bit quantization may be performed by binarizing values of a group of elements in the transformed inphase component to be a group of bits and binarizing values of a group of elements in the transformed quadrature component to be a group of bits. The one-bit quantized raw CSI feedback $\bar{H}_{1b}$ (inphase and quadrature components) may take values in {±1} or {1,0}. The UE 110 may generate a set of parameters associated with characteristics of the channel by the one-bit quantization.

It is to be understood that the structure 500 for performing the one-bit quantization shown in FIG. 5 is merely an embodiment. Any suitable unit and module can be added into the structure 500. For example, in some example embodiments, when the downlink channel quality is not good, there is a denoising unit in the structure. The transformed inphase component and the transformed quadrature component can be denoised before quantizing.

Referring back to the FIG. 3, the UE 110 may transmit 315 the set of parameters associated with characteristics of the channel, i.e. the one-bit quantized raw CSI feedback $\overline{H}_{1b}$ to the gNB 120. Depending on the CSI feedback configuration, the one-bit quantized raw CSI feedback can be transmitted in a Physical Uplink Control Channel (PUCCH) or a Physical Uplink Shared Channel (PUSCH).

Then the gNB 120 may recover 320 the CSI H from the set of parameters associated with characteristics of the channel, i.e. the one-bit quantized raw CSI feedback $\overline{H}_{1b}$. The gNB 120 can recover the CSI by a one-bit CSI recovered neural network. The ecovered neural network can characterize an association between the channel state information and a reference parameter characterizing the channel. Based on the association and the set of parameters associated with characteristics of the channel, the channel state information can be determined.

Figure 6:
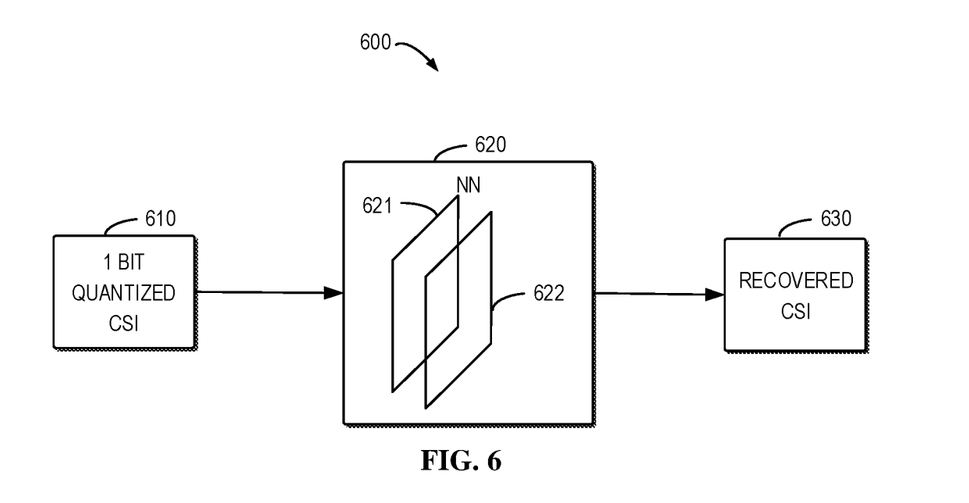
FIG. 6 shows an example structure for recovering the CSI feedback according to some example embodiments of the present disclosure.

FIG. 6 shows an example structure 600 for recovering the CSI feedback according to some example embodiments of the present disclosure. In the structure 600, the recovered neural network 620 may, for example, include layers 621 and 622. It is to be understood that the recovered neural network 620 shown in FIG. 6 is merely an example. The recovered neural network 620 may include any other layer.

The input 610, i.e. the one-bit quantized raw CSI feedback $\overline{H}_{1b}$, received from the UE 110, can be input into the recovered neural network 620, and the output 630 of the recovered neural network 620 can be the recovered CSI H. In the recovered neural network 620, the input is formulated into the 3-dimensional tensor notation, where the third dimension corresponds to the inphase and quadrature components of the one-bit quantized CSI.

The recovered neural network 620 may be well-trained. For example, the gNB 120 may generate a simulated reference signal for a transmission on a simulated channel between the UE 110 and the gNB 120 and determine a simulated receiving signal based on the simulated reference signal and predetermined parameters associated with the channel state information of the simulated channel.

Based on a one-bit quantization, which is similar with the one-bit quantization performed at the UE, the gNB 120 may determine a set of simulated parameters characterizing the simulated channel from the simulated reference signal. The recovered neural network 620 may be trained with a set of simulated parameters characterizing the simulated channel and predetermined parameters associated with the channel state information of the simulated channel.

To accommodate one-bit raw CSI feedback with various SNRs, the enhanced neural network may be trained for different SNR cases with a certain granularity. Since the input data has the similar feature but only varies with SNR, it is not necessary to train the whole deep neural network.

The neural network consists of concatenated CNN units following a fully-connected & Rectified Linear Unit (ReLU) layer. The CNN units act as the feature extraction and the fully-connected & ReLU layer tries to recover the data based on the extracted feature.

Thus, a training strategy for the enhanced neural network is proposed. The enhanced neural network consists of a feature extraction layer and a key recovery layer, where in this example the feature extraction layer includes consecutive CNN units and the key recover layer is the fully-connected layer & ReLU layer. The enhanced neural network can be trained from scratch using the input data with a fixed SNR as the training set and obtain the pre-trained neural network. The input data with different SNRs can be added to the training set, but only the key recovery layer is trained. Thus, an upgraded neural network can be obtained. In this way, significant efforts can be alleviated, leading to a fast and simple training procedure.

Furthermore, a proposed scheme can also be applied to the compressed CSI case. The compression can be carried out on the noisy CSI $\overline{Y}$ (see Equation (2)). Then the compressed noisy CSI $\overline{Y}_{com}$ goes through the one-bit quantizer and the one-bit quantized & raw compressed CSI $\overline{H}_{\{com,1b\}}$ can be obtained.

To recover CSI, differently from the uncompressed CSI case, a pre-processing unit is required to reconstruct the receiving compressed CSI based on the reported information of the compression at the UE. For example, the UE may carry CSI compression based on the common codebook and it will feedback the selected codebook indices to inform the gNB on the compression, so that the gNB can implement the pre-reconstruction. Accordingly, the input to the neural network should be the pre-reconstructed CSI $H_{1b}^{rec}$. The neural network should be trained by including this compressed case.

The proposed solution of the present disclosure requires least efforts on the current system but can provide a promising performance with such differentiations, taking advantages of deep neural network. The proposed CSI feedback can even be flexibly combined with existing overhead reduction schemes such as the beamformed CSI-RS and CSI compression, which further reduces the CSI overhead.

The proposed scheme supports various UE's implementations of the one-bit quantization on the non-estimated channel (noisy CSI-RS) in the code correlation domain, and denoised received CSI-RS after being transformed to the code correlation domain.

Compared to the current digital CSI feedback, the proposed CSI is the raw CSI largely alleviates the signal processing efforts at UE. It ensures very fast processing at UE and reduces the latency because the exact channel estimation at the UE is not required. The UE may only need to carry out "code matched filtering" (with respect to the CSI-RS sequences), one-bit quantization, and forward.

Compared to the analog feedback, the proposed CSI is digital and does not have power variation problem due to the power scaling in the uplink. The feedback overhead is also reduced, since the overhead of the analog feedback scales with the transmit antennas (ports). The channel recovery performance for the analog feedback is influenced by the channel variations of both the downlink and uplink, while the deep learning based neural network is much more powerful to deal with noisy CSI.

Figure 7:
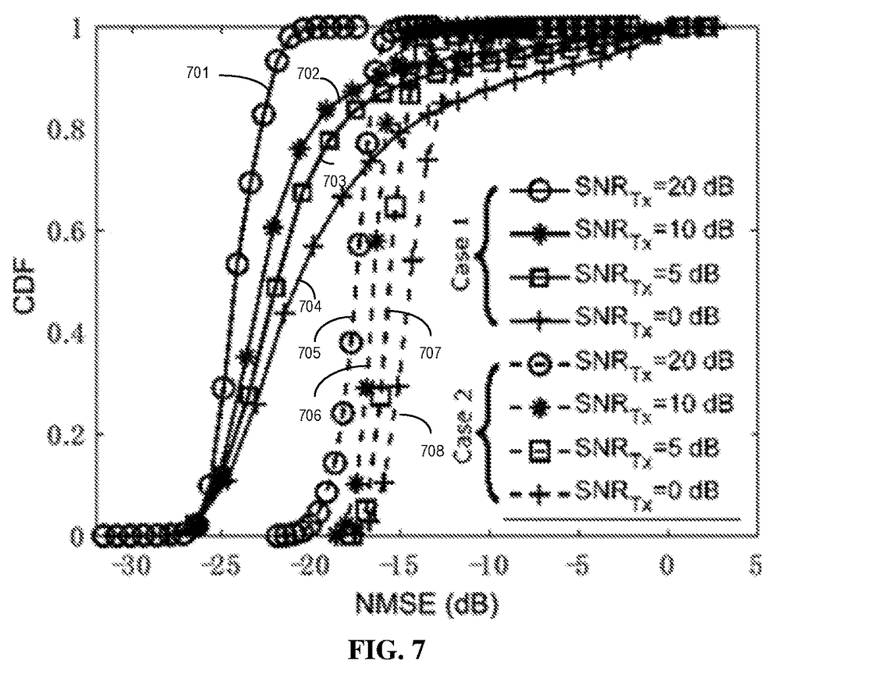
FIG. 7 shows Normalized Mean Square Error (NMSE) performance in an example simulation using deep Neural Network (NN) to recover CSI from one-bit quantized CSI feedback.
Figure 8A:
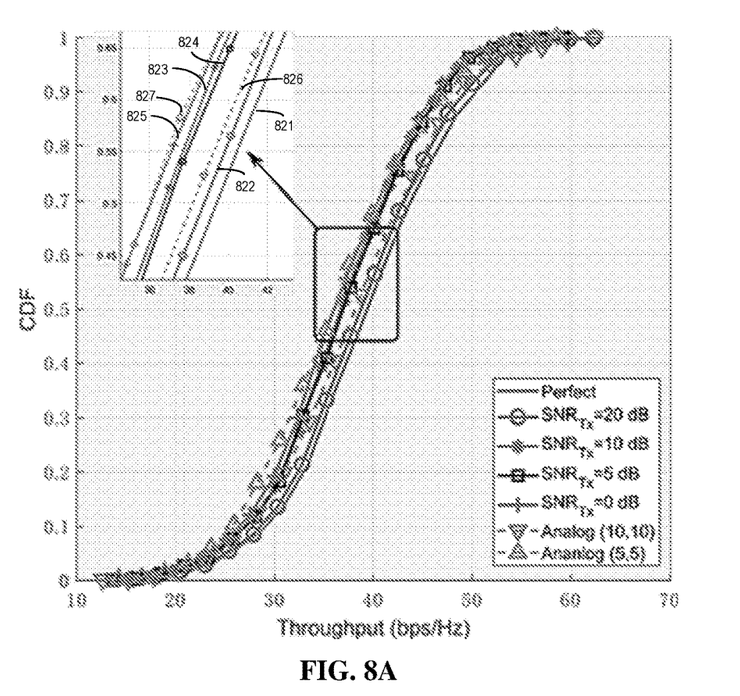
FIGS. 8A and 8B shows the throughput performance for different cases in the example simulation using deep NN.
Figure 8B:
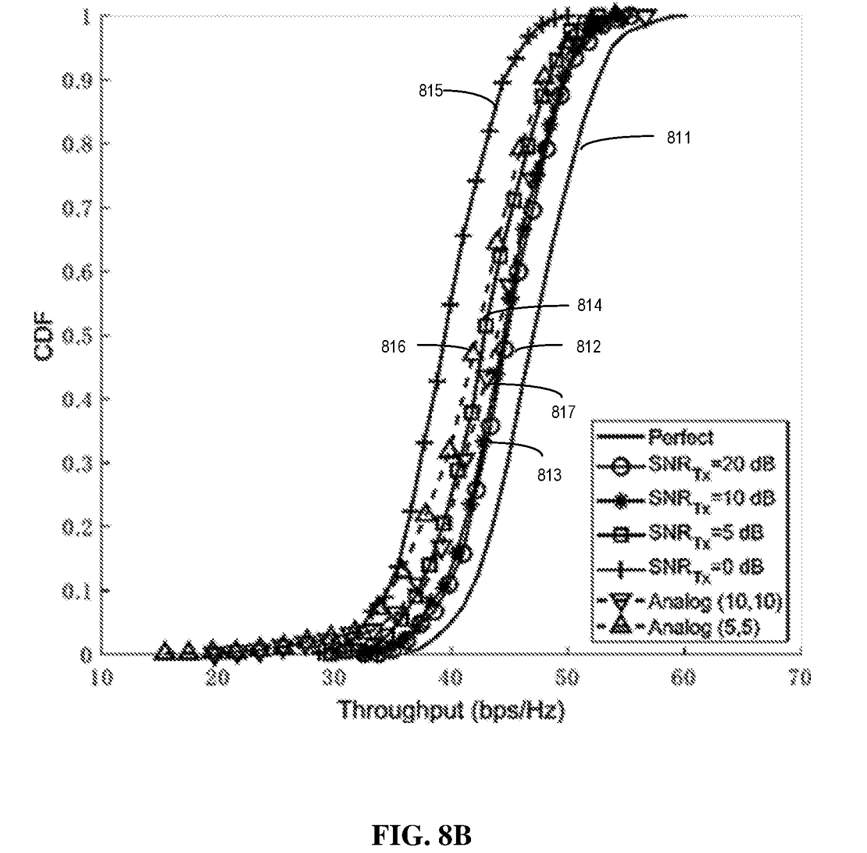

A simulation is performed for testing the one-bit quantization as described above. A mmWave multi-user MIMO system can be considered as the environment for the simulation. FIG. 7 shows Normalized Mean Square Error (NMSE) performance in an example simulation using deep Neural Network (NN) to recover CSI from one-bit quantized CSI feedback. FIGS. 8A and 8B shows the throughput performance for different cases in the example simulation using deep NN. The simulation setup is shown as below:

TABLE 1

Simulation setup
Simulation Parameters (Single-cell)

| | |
|---|---|
| Channel model | Clustered channel model [5] |
| # of clusters & rays/Cluster | 2 & 2 (Case 1) or 2 & 4 (Case 2) |
| Channel gain | Complex Normal distribution |
| Azimuth & Elevation angles | Laplacian distribution |
| Carrier frequency | 28 GHz |
| Array @ BS | 32 (ULA) |
| Array @ UE | 2 (ULA) |
| Number of transmission streams | 1 |

In this simulation, the deep CNN is implemented by MATLAB2018a. 4 CNN units can be considered for feature extraction and in the convolutional layer filters with $L_f$=[8, 16, 32, 64] for the consecutive units are applied, respectively. Two fully-connected layers are applied after the concatenated CNN units have the number of neurons 512 and 1024, acting as the key recovery part. The total data set includes 50000 samples, where 85% is used for training and the rest for validation. The training rate is 0.0002 with a gradient drop rate 0.9. We use the mini-batch size of 512 for the gradient descent.

FIG. 7 shows the Normalized Mean Square Error (NMSE) performance (case 1: curves 701-704 and case 2: 705-708) of the one-bit quantized CSI acquisition scheme and compared with perfect as well as the analog feedback for different $SNR_{Tx}$, namely $SNR_{Tx}$=20 dB, $SNR_{Tx}$=10 dB, $SNR_{Tx}$=5 dB and $SNR_{Tx}$=2 dB. $SNR_{Tx}$ is the transmit signal-to-noise ratio of the CSI-RS. The $SNR_{Tx}$=20 dB indicates the case that a relatively clean CSI is obtained at UE, i.e. a very good channel condition, or estimated channel is carried out, or the received CSI-RS after denoising and correlation. It can be observed that the estimated performance using the proposed deep NN varies with the $SNR_{Tx}$ but can perform better than the analog feedback, which depends on both the uplink and downlink SNR of the RS.

The analog CSI feedback may also be considered as one reference scheme for comparison. Least Squares (LS) channel estimation is performed with the knowledge of uplink channel and the power level of the analog signal. The uplink channel can be estimated via uplink reference signal, but in this simulations it is assumed to be perfect. Since the UE needs to amplify and forward the received CSI-RS, the downlink SNR and uplink SNR of the RS will influence the performance. Thus, considering ($SNR_{DL}$, $SNR_{UL}$)=(10,10) dB and (5,5) dB for the simulations.

The CDF of the throughput performance are shown by FIG. 8A (for case 1 in FIGS. 7) and 8B (for case 2 in FIG. 7). It can be observed that in Case 1 the performance (curves 822-825) of the proposed scheme is very close to the case with perfect (curve 821) CSI (≈98% at median) and a small performance degradation when channel quality is not good, 7% loss for $SNR_{Tx}$=5 dB at median. In Case 2 when there are more scatters in the channel, the performance (curves 812-815) degradation as compared to the perfect (curve 811) case is only <8% at median. UE can adjust its implementations based on channel quality.

Furthermore, the overhead calculation of the CSI feedback schemes as shown as below:

TABLE 2

Overhead Analysis

| | DL CSI-RS | CSI Feedback | UL Training |
|---|---|---|---|
| 1-bit quantized feedback | $O(M_T)$ {O(32)} | $2M_{R_k}M_T$ {64} (bits) | — |
| Analog Feedback | $O(M_T)$ {O(32)} | $O(M_{R_k}M_T)$ {O(64)} | $O(M_{R_k})$ {O(2)} | where {·} denotes the calculation for our example. The training overhead induced by CSI-RS is assumed to be the same for both cases. The CSI feedback is determined by the dimension of the channel to be fed back. For the proposed one-bit quantized feedback, the overhead can be computed by $2QM_{R_k}M_T$, Q=1, where Q is the number of bits for quantization. In the current system, usually 8 bits is required for CSI feedback. For the analog feedback, since UE directly forwards the received CSI-RS and thus the overhead is determined by the CSI-RSs, scaling with the size of the channel $O(M_{R_k}M_T)$ [2]. Additionally, the analog feedback scheme requires the uplink channel to recover the downlink channel and thus the uplink training overhead depends on the number of antennas at UE [2]. The scaling O(·) in analog CSI feedback can be modelled by multiplying a quota, which is an integer and usually greater than 2. Therefore, one-bit quantized CSI has a smaller overhead than the analog feedback.

Figure 9:
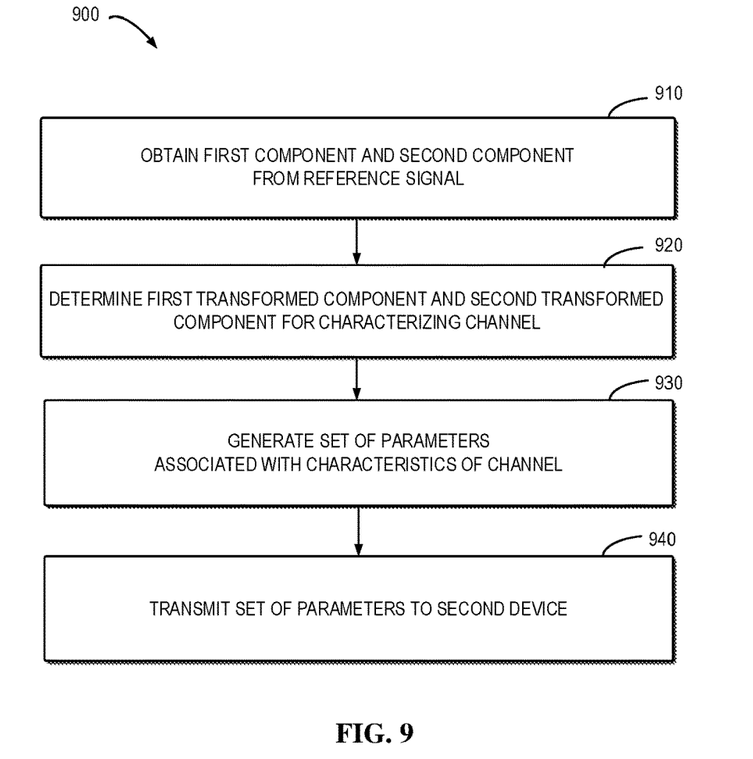
FIG. 9 a flowchart of a method implemented at a first device in accordance with some example embodiments of the present disclosure.

FIG. 9 shows a flowchart of an example method 900 for service management in a communication system. According to some example embodiments of the present disclosure. The method 900 can be implemented at the first device 110 as shown in FIG. 1. For the purpose of discussion, the method 90 will be described with reference to FIG. 1.

As shown in FIG. 9, at 910, if the first device receives, from a second device, a reference signal on a channel between the first device and the second device, the first device obtains a first component and a second component from the reference signal, the first component and the second component being orthogonal to each other.

In some example embodiments, the first device may receive, from the second device, a trigger for initiating the quantizing and transmitting the set of parameters, the trigger at least indicating a predetermined quantizing scheme for the reference signal.

In some example embodiments, the trigger is comprised in downlink control information or in a control element for medium access control.

In some example embodiments, the first component is an inphase component of the reference signal and the second component is a quadrature component of the reference signal.

At 920, the first device determines a first transformed component and a second transformed component for characterizing the channel by performing a transformation on the first component and the second component.

In some example embodiments, the first device may perform the transformation in a code correlation domain on the first component and the second component. The first device may determine, as the first transformed component, a transformed result related to the first component characterizing the channel in the code correlation domain and as the second transformed component, a transformed result related to the second component characterizing the channel in the code correlation domain.

At 930, the first device generates a set of parameters associated with characteristics of the channel by quantizing the first transformed component and the second transformed component.

In some example embodiments, the first device may binarize values of a first group of elements in the first transformed component to be a first group of bits and values of a second group of elements in the second transformed component to be a second group of bits. The first device may generate the set of parameters based on the a first group of bits and the second group of bits.

At 940, the first device transmits the set of parameters to the second device.

In some example embodiments, the first device comprises a terminal device and the second device comprises a network device.

Figure 10:
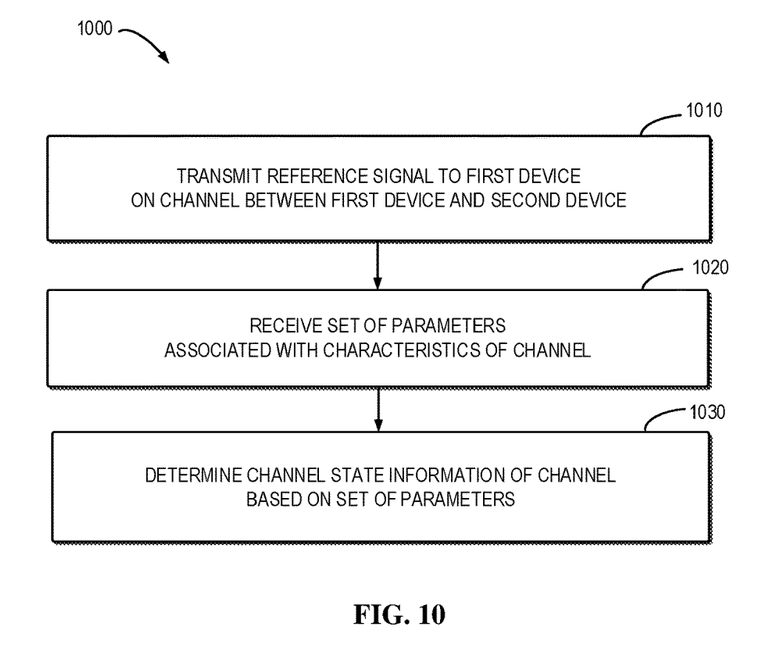
FIG. 10 shows a flowchart of a method implemented at a second device in accordance with some example embodiments of the present disclosure.

FIG. 10 shows a flowchart of an example method 1000 for service management in a communication system according to some example embodiments of the present disclosure. The method 1000 can be implemented at the second device 120 as shown in FIG. 1. For the purpose of discussion, the method 1000 will be described with reference to FIG. 1.

As shown in FIG. 10, at 1010, the second device 120 transmits a reference signal to a first device on a channel between the first device and the second device.

At 1020, the second device 120 receives, from a first device, a set of parameters associated with characteristics of the channel. The set of parameters is generated by transforming and quantizing a first component and a second component obtained from the reference signal at the first device and the first component and the second component are orthogonal to each other.

At 1030, the second device 120 determines channel state information of the channel based on the set of parameters.

In some example embodiments, the second device 120 may obtain an association between the channel state information and a reference parameter characterizing the channel and determine the channel state information based on the set of parameters and the association.

In some example embodiments, the second device 120 may generate a further reference signal for a simulated transmission on a simulated channel between the first device and the second device and determine a simulated receiving signal based on the further reference signal and a set of predetermined parameters indicating a channel state information of the simulated channel. The second device 120 may determine a set of simulated parameters characterizing the simulated channel based on the simulated receiving signal and determine the association based on the set of simulated parameters and the set of predetermined parameters.

In some example embodiments, the second device 120 may obtain a first simulated component and a second simulated component from the simulated receiving signal, the simulated first component and the simulated second component being orthogonal to each other, determine a first transformed simulated component and a second transformed simulated component for characterizing the simulated channel by performing a transformation on the first simulated component and the second simulated component and determine a set of simulated parameters associated with characteristics of the simulated channel by quantizing the first transformed simulated component and the second transformed simulated component.

In some example embodiments, the second device 120 may train a machine leaning model indicating the association with the set of simulated parameters and the set of predetermined parameters.

In some example embodiments, the first device comprises a terminal device and the second device comprises a network device.

In some example embodiments, an apparatus capable of performing the method 900 (for example, implemented at the first device 110) may comprise means for performing the respective steps of the method 900. The means may be implemented in any suitable form. For example, the means may be implemented in a circuitry or software module.

In some example embodiments, the apparatus comprises means for in response to receiving, from a second device, a reference signal on a channel between the first device and the second device, means for obtaining a first component and a second component from the reference signal, the first component and the second component being orthogonal to each other; determining a first transformed component and a second transformed component for characterizing the channel by performing a transformation on the first component and the second component; means for generating a set of parameters associated with characteristics of the channel by quantizing the first transformed component and the second transformed component; and means for transmitting the set of parameters to the second device.

In some example embodiments, an apparatus capable of performing the method 1000 (for example, implemented at the second device 120) may comprise means for performing the respective steps of the method 1000. The means may be implemented in any suitable form. For example, the means may be implemented in a circuitry or software module.

In some example embodiments, the apparatus comprises means for transmitting a reference signal to a first device on a channel between the first device and the second device; means for receiving, from a first device, a set of parameters associated with characteristics of the channel, the set of parameters being generated by transforming and quantizing a first component and a second component obtained from the reference signal at the first device, the first component and the second component being orthogonal to each other; and means for determining channel state information of the channel based on the set of parameters.

Figure 11:
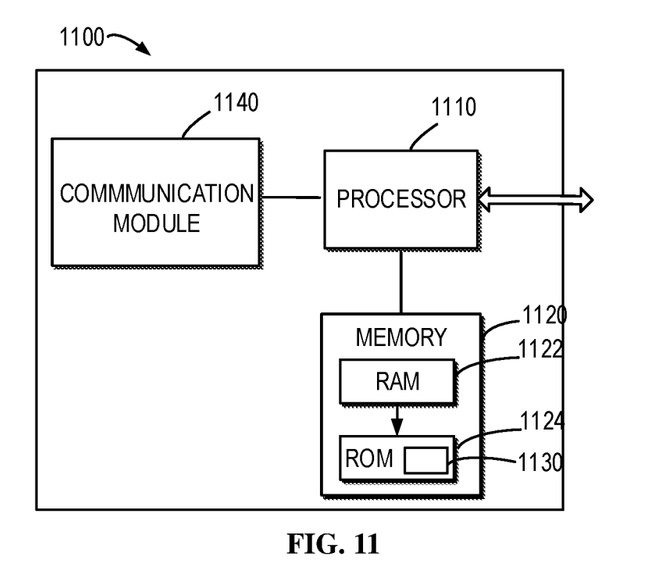
FIG. 11 illustrates a simplified block diagram of an apparatus that is suitable for implementing some other embodiments of the present disclosure.

FIG. 11 is a simplified block diagram of a device 1100 that is suitable for implementing embodiments of the present disclosure. The device 1100 may be provided to implement the communication device, for example the UE 110 and the gNB 120 as shown in FIG. 1. As shown, the device 1100 includes one or more processors 1110, one or more memories 1140 coupled to the processor 1110, and one or more transmitters and/or receivers (TX/RX) 1140 coupled to the processor 1110.

The TX/RX 1140 is for bidirectional communications. The TX/RX 1140 has at least one antenna to facilitate communication. The communication interface may represent any interface that is necessary for communication with other network elements.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor 1110. The program 1130 may be stored in the ROM 1120. The processor 1110 may perform any suitable actions and processing by loading the program 1130 into the RAM 1120.

The embodiments of the present disclosure may be implemented by means of the program 1130 so that the device 1100 may perform any process of the disclosure as discussed with reference to FIGS. 9-10. The embodiments of the present disclosure may also be implemented by hardware or by a combination of software and hardware.

Figure 12:
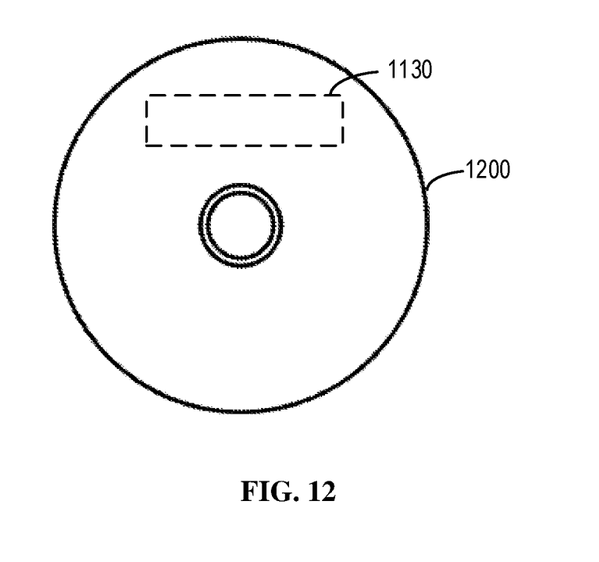
FIG. 12 illustrates a block diagram of an example computer readable medium in accordance with some example embodiments of the present disclosure.

In some embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. The computer readable medium may include any types of tangible non-volatile storage, such as ROM, EPROM, a flash memory, a hard disk, CD, DVD, and the like. FIG. 12 shows an example of the computer readable medium 1200 in form of CD or DVD. The computer readable medium has the program 1130 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 900 and 1000 as described above with reference to FIGS. 9-10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
   at least one processor; and
   at least one memory including computer program code;
   wherein the at least one memory and the computer program codes are configured to, with the at least one processor, cause the first device at least to:
      in response to receiving, from a second device, a reference signal on a channel between the first device and the second device, obtain a first component and a second component from the reference signal, the first component and the second component being orthogonal to each other;

determine a first transformed component and a second transformed component for characterizing the channel by performing a transformation on the first component and the second component;

generate a set of parameters associated with characteristics of the channel by quantizing the first transformed component and the second transformed component;

transmit the set of parameters to the second device, and receive, from the second device, a trigger for initiating the quantizing and transmitting the set of parameters, the trigger at least indicating a predetermined quantizing scheme for the reference signal.

2. The first device of claim 1, wherein the trigger is comprised in downlink control information or in a control element for medium access control.

3. The first device of claim 1, wherein the first component comprises an inphase component of the reference signal and the second component comprises a quadrature component of the reference signal.

4. The first device of claim 1, wherein the first device is caused to determine the first transformed component and the second transformed component by:

performing the transformation in a code correlation domain on the first component and the second component;

determining, as the first transformed component, a transformed result related to the first component characterizing the channel in the code correlation domain; and determining, as the second transformed component, a transformed result related to the second component characterizing the channel in the code correlation domain.

5. The first device of claim 1, wherein the first device is caused to generate the set of parameters by:

binarizing values of a first group of elements in the first transformed component to be a first group of bits;

binarizing values of a second group of elements in the second transformed component to be a second group of bits; and generating the set of parameters based on the a first group of bits and the second group of bits.

6. The first device of claim 1, wherein the first device comprises a terminal device and the second device comprises a network device.

7. A second device comprising:
at least one processor; and
at least one memory including computer program code;
wherein the at least one memory and the computer program codes are configured to, with the at least one processor, cause the second device at least to:
transmit a reference signal to a first device on a channel between the first device and the second device;
receive, from the first device, a set of parameters associated with characteristics of the channel, the set of parameters being generated by transforming and quantizing a first component and a second component obtained from the reference signal at the first device, the first component and the second component being orthogonal to each other;
determine channel state information of the channel based on the set of parameters, wherein determining the channel state information comprises:
obtaining an association between the channel state information and a reference parameter characterizing the channel; and
determining the channel state information based on the set of parameters and the association;
generate a further reference signal for a simulated transmission on a simulated channel between the first device and the second device;
determine a simulated receiving signal based on the further reference signal and a set of predetermined parameters indicating a channel state information of the simulated channel;
determine a set of simulated parameters characterizing the simulated channel based on the simulated receiving signal; and
determine the association based on the set of simulated parameters and the set of predetermined parameters.

8. The second device of claim 7, wherein the second device is caused to determine the set of simulated parameters by:

obtaining a first simulated component and a second simulated component from the simulated receiving signal, the simulated first component and the simulated second component being orthogonal to each other;

determining a first transformed simulated component and a second transformed simulated component for characterizing the simulated channel by performing a transformation on the first simulated component and the second simulated component; and determining the set of simulated parameters associated with characteristics of the simulated channel by quantizing the first transformed simulated component and the second transformed simulated component.

9. The second device of claim 7, wherein the second device is caused to determine the association by:

training a machine leaning model indicating the association with the set of simulated parameters and the set of predetermined parameters.

10. The second device of claim 7, wherein the first device comprises a terminal device and the second device comprises a network device.

11. A method, comprising:
in response to receiving, from a second device, a reference signal on a channel between the first device and the second device, obtaining a first component and a second component from the reference signal, the first component and the second component being orthogonal to each other;

determining a first transformed component and a second transformed component for characterizing the channel by performing a transformation on the first component and the second component;

generating a set of parameters associated with characteristics of the channel by quantizing the first transformed component and the second transformed component;

transmitting the set of parameters to the second device; and receiving, from the second device, a trigger for initiating the quantizing scheme for the reference signal.

12. The method of claim 11, wherein the trigger is comprised in downlink control information or in a control element for medium access control.

13. The method of claim 11, wherein the first component comprises an inphase component of the reference signal and the second component comprises a quadrature component of the reference signal.

14. The method of claim 11, wherein determining the first transformed component and the second transformed component comprises:
   performing the transformation in a code correlation domain on the first component and the second component;
   determining, as the first transformed component, a transformed result related to the first component characterizing the channel in the code correlation domain; and
   determining, as the second transformed component, a transformed result related to the second component characterizing the channel in the code correlation domain.

15. The method of claim 11, wherein generating the set of parameters comprises:
   binarizing values of a first group of elements in the first transformed component to be a first group of bits;
   binarizing values of a second group of elements in the second transformed component to be a second group of bits; and
   generating the set of parameters based on the first group of bits and the second group of bits.

16. The method of claim 11, wherein the first device comprises a terminal device and the second device comprises a network device.

17. A method comprising:
   transmitting a reference signal to a first device on a channel between the first device and a second device;
   receiving, from the first device, a set of parameters associated with characteristics of the channel, the set of parameters being generated by transforming and quantizing a first component and a second component obtained from the reference signal at the first device, the first component and the second component being orthogonal to each other;
   determining channel state information of the channel based on the set of parameters, wherein determining the channel state information comprises:
      obtaining an association between the channel state information and a reference parameter characterizing the channel; and
      determining the channel state information based on the set of parameters and the association:
   generate a further reference signal for a simulated transmission on a simulated channel between the first device and the second device;
   determine a simulated receiving signal based on the further reference signal and a set of predetermined parameters indication a channel state information of the simulated channel;
   determine a set of simulated parameters characterizing the simulated channel based on the simulated receiving signal; and
   determine the association based on the set of simulated parameters and the set of predetermined parameters.

18. The method of claim 17, wherein determining the set of simulated parameters comprises:
   obtaining a first simulated component and a second simulated component from the simulated receiving signal, the simulated first component and the simulated second component being orthogonal to each other;
   determining a first transformed simulated component and a second transformed simulated component for characterizing the simulated channel by performing a transformation on the first simulated component and the second simulated component; and
   determining the set of simulated parameters associated with characteristics of the simulated channel by quantizing the first transformed simulated component and the second transformed simulated component.

19. The method of claim 17, wherein determining the association comprises:
   training a machine leaning model indicating the association with the set of simulated parameters and the set of predetermined parameters.

20. The method of claim 17, wherein the first device comprises a terminal device and the second device comprises a network device.

21. A non-transitory computer readable medium comprising program instructions for causing an apparatus to perform at least the method of claim 11.

22. A non-transitory computer readable medium comprising program instructions for causing an apparatus to perform at least the method of claim 17.

* * * * *